UNITED STATES PATENT OFFICE.

CHARLES ARNOIS, OF BRIDGEPORT, CONNECTICUT.

PROCESS OF TREATING PYRITES CINDERS FOR THE MANUFACTURE OF PAINT.

SPECIFICATION forming part of Letters Patent No. 413,428, dated October 22, 1889.

Application filed March 13, 1889. Serial No. 303,120. (No specimens.)

*To all whom it may concern:*

Be it known that I, CHARLES ARNOIS, a citizen of the United States, and a resident of Bridgeport, in the county of Fairfield and State of Connecticut, have invented a certain new and useful Process of Treating Pyrites Cinders for the Manufacture of Paint, of which the following is a specification.

This invention relates to an improved process of manufacturing metallic paint solely from pyrites cinders. For this purpose the cinders in a granulated or ground state are mixed with carbonate of lime and common salt, and this mixture is exposed to a dull-red heat in a furnace under the influence of an oxidizing atmosphere until the sulphur of the cinders is burned out. The carbonate of lime promotes greatly the conversion of the sulphurets of iron into peroxide of iron, forming at the same time sulphate of lime, and it also reduces the small quantities of sulphates of the heavy metals to their oxides. As the percentage of unburned sulphur in the cinders does vary widely, (from two to eight per cent.,) the amount of carbonate of lime used will also vary. The proportion of carbonate of lime to the unburned sulphur should be as three to one. The salt is added principally to give the desired color, (from a reddish-brown to a darker shade,) according to its percentage, from one and one-half to four.

With cinders of five per cent. sulphur I use fifteen per cent. of carbonate of lime and two per cent. of salt, and I expose the mixture to a dull-red heat of about 1,100° Fahrenheit for two hours.

After the calcining process the paint may be ground dry or wet to the desired fineness.

What I claim as new, and desire to secure by Letters Patent, is—

The process, as above described, of manufacturing metallic paint from pyrite-cinders by treating the same with a combination of carbonate of lime and salt, in proportions as given above, in an oxidizing dull-red heat.

Signed at Bridgeport, in the county of Fairfield and State of Connecticut, this 11th day of March, A. D. 1889.

CHARLES ARNOIS. [L. S.]

Witnesses:
 WILLIAM H. COMLEY,
 G. W. MORGAN.